United States Patent
Huang et al.

(10) Patent No.: US 12,031,958 B2
(45) Date of Patent: Jul. 9, 2024

(54) IMPURITY DETECTION METHOD OF LATAMOXEF SODIUM

(71) Applicant: Hainan Hailing Chemipharma Corporation Ltd., Haikou (CN)

(72) Inventors: Youxing Huang, Haikou (CN); Yifeng Lu, Haikou (CN); Guorong Lu, Haikou (CN)

(73) Assignee: HAINAN HAILING CHEMIPHARMA CORPORATION LTD., Haikou (CN)

( * ) Notice: Subject to any disclaimer, the term of this patent is extended or adjusted under 35 U.S.C. 154(b) by 436 days.

(21) Appl. No.: 17/564,242

(22) Filed: Dec. 29, 2021

(65) Prior Publication Data

US 2022/0381749 A1 Dec. 1, 2022

Related U.S. Application Data

(63) Continuation of application No. PCT/CN2021/134909, filed on Dec. 2, 2021.

(30) Foreign Application Priority Data

May 28, 2021 (CN) .......................... 202110591795.8

(51) Int. Cl.
*G01N 30/06* (2006.01)
*G01N 30/22* (2006.01)

(52) U.S. Cl.
CPC ............ *G01N 30/22* (2013.01); *G01N 30/06* (2013.01)

(58) Field of Classification Search
CPC .............................. G01N 30/06; G01N 30/22
See application file for complete search history.

(56) References Cited

FOREIGN PATENT DOCUMENTS

| CN | 107102092 A | * | 8/2017 | ............. G01N 30/06 |
|---|---|---|---|---|
| CN | 111487354 A | * | 8/2020 | ............. G01N 30/06 |

* cited by examiner

*Primary Examiner* — Jamel E Williams
*Assistant Examiner* — Alex T Devito

(57) ABSTRACT

A impurity detection method of latamoxef sodium is configured to detect the impurities in latamoxef sodium for injection by using high performance liquid chromatography. A chromatographic condition is as follows: taking Agilent ZORBAX SB-CN cyano bonded silica gel column as a stationary phase, taking 0.005~0.015 mol/L ammonium acetate solution-methanol as a mobile phase A; taking 0.02~0.03 mol/L ammonium acetate solution-acetonitrile as a mobile phase B; adjusting a pH value of the ammonium acetate solution to 5.8~6.5; the present disclosure has advantages of a simple operation, high column efficiency, a moderate tailing factor and a retention time of a main peak, high detection accuracy of strong alkali damage, effective separation between the main peak and each impurity peak without interference, which is conducive to accurately controlling quality of lyophilized powder of latamoxef sodium for injection and ensuring quality of drugs.

9 Claims, No Drawings

IMPURITY DETECTION METHOD OF LATAMOXEF SODIUM

BACKGROUND

1. Technical Field

The present disclosure generally relates to the field of medical test technologies, and especially relates to a impurity detection method of latamoxef sodium.

2. Description of Related Art

Latamoxef sodium, with a chemical name of (6R, 7R)-7-[2-carboxy-2-(4-hydroxyphenyl)-acetylamino]-7-methoxy-3-{(1-methyl-1H-tetrazole-5-ylthio) methyl}-8-oxo-5-oxa-1-azabicyclo [4, 2, 0] octyl-2-ene-2-formic acid disodium salt. As a third generation cephalosporin antibiotic of semisynthetic oxycephem, latamoxef sodium is used for sepsis caused by sensitive gram-negative bacilli, lower respiratory infection, abdominal biliary infection, complex urinary tract infection and severe skin and soft tissue infection, which has characteristics of wide antibacterial spectrum and strong antibacterial activity.

Some impurities will be produced in a preparation, transportation and storage of conventional lyophilized powder of latamoxef sodium for injection, in this way, an effective monitoring of drug impurities is one of important conditions for controlling drug quality. At present, high performance liquid chromatography (HPLC) is usually used to detect impurities of raw materials of latamoxef sodium and lyophilized powder of latamoxef sodium for injection. For example, CN patent 202010798209.2 discloses a detection method for a polymer of latamoxef sodium for injection and an on-line identification method thereof, which uses multi-dimensional liquid chromatography to separate and determine results of different targets, however, steps are complex and a resolution of various polymers is low. Zhang Wenting et al. used high performance liquid chromatography to determine related substances of latamoxef sodium for injection which has a simple operation and the related substances can be determined under a lower detection limit of 0.02 ng. However, the lyophilized powder of latamoxef sodium for injection is not only easily affected by drying conditions, excipient in the lyophilized power, impurity types and impurity content, but also prone to obvious degradation substances after strong acid and alkali conditions. In the conventional process of using high performance liquid chromatography to determine the related substances of latamoxef sodium for injection, a shape of a main peak is poor, a tailing factor of the main peak is too large, and the separation between the main peak and impurity peaks, and impurity peaks thereamong is low, which greatly limits accurate and efficient detection and control of the impurities in the lyophilized powder of latamoxef sodium for injection. Therefore, to find a impurity detection method of latamoxef sodium with a simple operation and a good detection effect is conducive to accurately controlling the quality of lyophilized powder of latamoxef sodium for injection and ensuring the quality safety of drugs.

SUMMARY

The technical problems to be solved: in view of the shortcomings of the related art, the present disclosure provides a impurity detection method of latamoxef sodium which can have advantages of a simple operation, good repeatability and high column efficiency, a moderate tailing factor and a retention time of a main peak, high detection accuracy of strong alkali damage, effective separation between the main peak and each impurity peak without interference, which is conducive to accurately controlling quality of lyophilized powder of latamoxef sodium for injection and ensuring quality of drugs.

The technical solution adopted for solving technical problems of the present disclosure is:

A impurity detection method of latamoxef sodium configured to detect the impurities in latamoxef sodium for injection by using high performance liquid chromatography; chromatographic conditions is as follows: a chromatographic column: taking Agilent ZORBAX SB-CN cyano bonded silica gel column as a stationary phase;

a mobile phase: taking 0.005~0.015 mol/L ammonium acetate solution-methanol as a mobile phase A, wherein ammonium acetate solution: methanol is equal to 55~60: 40~45, V/V; taking 0.02~0.03 mol/L ammonium acetate solution-acetonitrile as a mobile phase B, wherein ammonium acetate solution: acetonitrile is equal to 85~90:10~15 V/V; and adjusting a pH value of the ammonium acetate solution to 5.8~6.5.

Wherein a length and an inner diameter of the Agilent ZORBAX SB-CN cyano bonded silica gel chromatographic column are 250 mm×4.6 mm, and a packing material size is 5 μm.

Wherein the pH value of the ammonium acetate solution in the mobile phase A is adjusted by acetic acid to be 6.0; in the mobile phase B, the pH value of the ammonium acetate solution is adjusted by acetic acid to be 6.5.

Wherein an elution process is a gradient elution process, with the elution progress, a volume ratio of the mobile phase A to the mobile phase B is gradually reduced from 73~78: 22~27 to 28~33:67~72, and then increased from 28~33: 67~72 to 73~78:22~27 for performing gradient elution to separate impurities.

Wherein the gradient elution process is that:
at 0 min, the volume ratio of the mobile phase A to the mobile phase B is 78:22;
at 10 min, the volume ratio of the mobile phase A to the mobile phase B is 55:45;
at 16 mm, the volume ratio of the mobile phase A to the mobile phase B is 30:70;
at 20 min, the volume ratio of the mobile phase A to the mobile phase B is 30:70;
at 25 min, the volume ratio of the mobile phase A to the mobile phase B is 45:55; and
at 30 min, the volume ratio of the mobile phase A to the mobile phase B is 78:22.

Wherein a flow rate of the mobile phase is 0.5~0.8 mL/min.

Wherein a detection wavelength is 250~260 nm.

Wherein a column temperature is 30~35° C.

Wherein an injection volume is 10~20 uL and an injection concentration is 1~2 mg/mL.

The present disclosure provides the advantages as below, compared with the related art: the present disclosure establishes a method for analyzing and detecting the impurities in latamoxef sodium based on the Agilent ZORBAX SB-CN cyano bonded silica gel chromatographic column, the ammonium acetate solution-methanol mixed solution with a concentration of 0.005~0.015 mol/L is taken as the mobile phase A, the ammonium acetate solution-acetonitrile mixed solution with a concentration of 0.02~0.03 mol/L is taken as the mobile phase B, and the pH value of the ammonium acetate solution is adjusted at the same time, so that the related substances of latamoxef sodium solution for injection are detected. The results indicate that the number of theoretical plates of the main peak is more than 2000, the column efficiency is high, the tailing factor of the main peak is moderate, the resolution between the main peak and the impurity peaks and each two of the impurity peaks can be more than 1.65, the retention time of the main peak is moderate, both the peak shape and the repeatability are good. In addition, after treatment under strong alkali conditions, the resolution of any adjacent peaks can reach more than 2.0, the main peak can be effectively separated from each impurity peak without interference, and the retention time of the main peak can be effectively maintained within 16 min. The detection accuracy is high, which is conducive to more accurate and efficient detection and analysis of the impurities in lyophilized powder of latamoxef sodium for injection.

DETAILED DESCRIPTION

In order to more clearly understand the technical solution hereinafter in embodiments of the present disclosure, reference will now be made in detail to embodiments to further explain the present disclosure.

Unless otherwise specified, experimental methods used in the embodiment of the present disclosure are conventional methods.

The materials and reagents used in the embodiment of the present disclosure can be obtained from commercial sources, unless otherwise specified.

A First Embodiment

High performance liquid chromatography (HPLC) is used to detect the impurities in latamoxef sodium for injection;

a chromatographic column: taking Agilent ZORBAX SB-CN cyano bonded silica gel column as a stationary phase; wherein a length and an inner diameter of the Agilent ZORBAX SB-CN cyano bonded silica gel chromatographic column are 250 mm×4.6 mm, and a packing material size is 5 μm;

a mobile phase: taking 0.005~0.015 mol/L ammonium acetate solution-methanol as a mobile phase A; taking 0.02~0.03 mol/L ammonium acetate solution-acetonitrile as a mobile phase B; and adjusting a pH value of the ammonium acetate solution to 5.8.

An elution method: eluting equivalently with a volume ratio of the mobile phase A to the mobile phase B of 70:30, and a flow rate of the mobile phase is 0.5 mL/min.

A detection wavelength is 254 nm.
An injection volume is 10 uL.
A column temperature is 30° C.

A Second Embodiment

High performance liquid chromatography (HPLC) is used to detect the impurities in latamoxef sodium for injection;

a chromatographic column: taking Agilent ZORBAX SB-CN cyano bonded silica gel column as a stationary phase; wherein a length and an inner diameter of the Agilent ZORBAX SB-CN cyano bonded silica gel chromatographic column are 250 mm×4.6 mm, and a packing material size is 5 μm;

a mobile phase: taking 0.005~0.015 mol/L ammonium acetate solution-methanol (60:40, V/V) as a mobile phase A; taking 0.02~0.03 mol/L ammonium acetate solution-acetonitrile (90:10, V/V) as a mobile phase B; and adjusting a pH value of the ammonium acetate solution to 6.5.

An elution method: a gradient elution, the flow rate of the mobile phase is 0.8 mL/min; the elution procedure is:

| Time/min | a volume ratio of the mobile phase A to the mobile phase B |
|---|---|
| 0 | 70:30 |
| 10 | 50:50 |
| 16 | 25:75 |
| 20 | 25:75 |
| 25 | 50:50 |
| 30 | 70:30 |

A detection wavelength is 254 nm.
An injection volume is 10 uL.
A column temperature is 35° C.

A Third Embodiment

High performance liquid chromatography (HPLC) is used to detect the impurities in latamoxef sodium for injection;

a chromatographic column: taking Agilent ZORBAX SB-CN cyano bonded silica gel column as a stationary phase; wherein a length and an inner diameter of the Agilent ZORBAX SB-CN cyano bonded silica gel chromatographic column are 250 mm×4.6 mm, and a packing material size is 5 μm;

a mobile phase: taking 0.005~0.015 mol/L ammonium acetate solution-methanol (60:40, V/V) as a mobile phase A; taking 0.02~0.03 mol/L ammonium acetate solution-acetonitrile (90:10, V/V) as a mobile phase B; and adjusting a pH value of the ammonium acetate solution to 6.0.

An elution method: a gradient elution, the flow rate of the mobile phase is 0.6 mL/min; the elution procedure is:

| Time/min | a volume ratio of the mobile phase A to the mobile phase B |
|---|---|
| 0 | 70:30 |
| 10 | 50:50 |
| 16 | 25:75 |
| 20 | 25:75 |
| 25 | 50:50 |
| 30 | 70:30 |

A detection wavelength is 254 nm.
An injection volume is 10 uL.
A column temperature is 30° C.

A Fourth Embodiment

High performance liquid chromatography (HPLC) is used to detect the impurities in latamoxef sodium for injection;

a chromatographic column: taking Agilent ZORBAX SB-CN cyano bonded silica gel column as a stationary phase; wherein a length and an inner diameter of the Agilent ZORBAX SB-CN cyano bonded silica gel chromatographic column are 250 mm×4.6 mm, and a packing material size is 5 μm;

a mobile phase: taking 0.005~0.015 mol/L ammonium acetate solution-methanol (60:40, V/V) as a mobile phase A; taking 0.02~0.03 mol/L ammonium acetate solution-acetonitrile (90:10, V/V) as a mobile phase B; and adjusting a pH value of the ammonium acetate solution to 6.0.

An elution method: a gradient elution, the flow rate of the mobile phase is 0.6 mL/min; the elution procedure is:

| Time/min | a volume ratio of the mobile phase A to the mobile phase B |
|---|---|
| 0 | 73:27 |
| 10 | 50:50 |
| 16 | 28:72 |
| 20 | 28:72 |
| 25 | 50:50 |
| 30 | 73:27 |

A detection wavelength is 254 nm.
An injection volume is 10 uL.
A column temperature is 30° C.

A Fifth Embodiment

High performance liquid chromatography (HPLC) is used to detect the impurities in latamoxef sodium for injection;
a chromatographic column: taking Agilent ZORBAX SB-CN cyano bonded silica gel column as a stationary phase; wherein a length and an inner diameter of the Agilent ZORBAX SB-CN cyano bonded silica gel chromatographic column are 250 mm×4.6 mm, and a packing material size is 5 μm;
a mobile phase: taking 0.005~0.015 mol/L ammonium acetate solution-methanol (60:40, V/V) as a mobile phase A; taking 0.02~0.03 mol/L ammonium acetate solution-acetonitrile (90:10, V/V) as a mobile phase B; and adjusting a pH value of the ammonium acetate solution to 6.0.
An elution method: a gradient elution, the flow rate of the mobile phase is 0.6 mL/min; the elution procedure is:

| Time/min | a volume ratio of the mobile phase A to the mobile phase B |
|---|---|
| 0 | 78:22 |
| 10 | 55:45 |
| 16 | 30:70 |
| 20 | 30:70 |
| 25 | 45:55 |
| 30 | 78:22 |

A detection wavelength is 254 nm.
An injection volume is 10 uL.
A column temperature is 30° C.

A Sixth Embodiment

The high performance liquid chromatography is used to detect the impurities in latamoxef sodium for injection. A difference between the sixth embodiment and the fifth embodiment is that: in the sixth embodiment, the pH value of the ammonium acetate solution in the mobile phase A is adjusted by acetic acid to 6.0; in the mobile phase B, the pH value of the ammonium acetate solution is adjusted by acetic acid to 6.5.

A First Comparative Example

In the first comparative example, the high performance liquid chromatography is used to detect the impurities in latamoxef sodium for injection. A difference between the first comparative example and the fifth embodiment is that: in the first comparative example, octadecyl silane bonded silica gel column TSKgel ODS-100Z C18, which has a length and an inner diameter of 150×4.6 mm, and a packing material size of 5 μm, is taken as the stationary phase.

A Second Comparative Example

In the second comparative example, the high performance liquid chromatography is used to detect the impurities in latamoxef sodium for injection. A difference between the second comparative example and the fifth embodiment is that: in the second comparative example, the pH value of the ammonium acetate solution in the mobile phase is adjusted to 7.5.

A Third Comparative Example

In the third comparative example, the high performance liquid chromatography is used to detect the impurities in latamoxef sodium for injection. A difference between the third comparative example and the fifth embodiment is that: in the third comparative example, the mobile phase is changed as follows: 0.01 mol/L ammonium acetate solution-methanol (60:40, V/V) is taken as the mobile phase A; 0.025 mol/L ammonium acetate solution-methanol (90:10, V/V) is taken as the mobile phase B;
1. Preparation of a test sample solution of latamoxef sodium for injection: accurately weighing a lyophilized powder sample of latamoxef sodium for injection (equivalent to 25 mg of latamoxef sodium), and putting into a 25 ml volumetric flask, adding water to dissolve the lyophilized powder sample to a constant volume, to be taken as the test sample solution. In the same way, a reference solution is prepared with the standard of latamoxef sodium (with a purity of 97.6%).

According to the impurity detection methods of latamoxef sodium for injection in the above first to sixth embodiments and the first to third comparative examples, respectively, injecting the test solution into the high performance liquid chromatography, detecting the impurities according to the above different chromatographic conditions, deducting the solvent peak and an auxiliary material peak, and investigating the theoretical plate of the main peak, the tailing factor of the main peak, the retention time of the main peak and the resolution of any adjacent peaks, the result is shown in the table below:

| Embodiments | Number of theoretical plates of main peak | Tailing factor of main peak | Retention time of main peak/min | Resolution of any adjacent peaks |
|---|---|---|---|---|
| Embodiment 1 | 5818 | 0.96 | 20.2 | 2.1-3.9 |
| Embodiment 2 | 6605 | 0.99 | 18.8 | 2.3 4.4 |
| Embodiment 3 | 7039 | 1.01 | 13.8 | 2.6-4.9 |
| Embodiment 4 | 7213 | 1.00 | 14.7 | 2.5-5.1 |
| Embodiment 5 | 7548 | 1.04 | 11.3 | 3.0-5.8 |
| Embodiment 6 | 8004 | 1.02 | 10.9 | 3.6 6.1 |
| Comparative example 1 | 4722 | 0.98 | 28.6 | 1.33.3 |

It can be seen from the above table that, the first to sixth embodiments are provided for taking Agilent ZORBAX SB-CN cyano bonded silica gel column as the stationary phase, using a mixed solution with a certain concentration that is mixed by the ammonium acetate solution and the methanol as the mobile phase A and a mixed solution with a certain concentration that is mixed by the ammonium acetate solution and the acetonitrile as the mobile phase B, and under the condition of adjusting the pH value of the mobile phase, the related substances of latamoxef sodium solution for injection are detected. At the test sample concentration of 1 mg/mL, the number of theoretical plates of the main peak is more than 2000, and the tailing factor is good, which can be between 0.95~1.05. At the same time, the retention time of the main peak is moderate, and the resolution between the main peak and the impurity peak and each two of the impurity peaks can be more than 1.65. Among them, a detection effect of the sixth embodiment is the best, the retention time of the main peak in the first comparative example is significantly prolonged, and the resolution between the main peak and the impurity peak and each two of the impurity peaks is poor.

Meanwhile, according to the chromatographic condition of the fifth embodiment, results of precision and the repeatability tests show that RSD<0.8% (n=5), and the precision and the repeatability of the detection method are good.

2. Strong Alkali Damage Test

Accurately weighING the lyophilized powder sample of latamoxef sodium for injection, placing in a 50 ml volumetric flask to add 1 ml of NaOH solution with a concentration of 2 mol/L, and then placing for 1 h at room temperature of 27° C., adding 1 ml of HCl solution with a concentration of 2 mol for neutralization, adding water to volume to the scale to evenly shake, and then being taken as the test solution. Preparing a blank excipient solution in the same way for performing a strong alkali damage test.

Sampling 10 uL of test solution of latamoxef sodium for injection and injecting into the high performance liquid chromatography. Performing detection and analysis by using the chromatographic conditions of the fifth embodiment and the second and third comparative examples respectively, to observe the separation of degradation products that has been generated from the main peak and the retention time of the main peak. The results are shown in the table below:

| Embodiment | Degradation product normalization % | Resolution of any adjacent peaks | Retention time of main peak /min |
|---|---|---|---|
| Embodiment 5 | 12.6 | 2.3-6.3 | 15.2 |
| Comparative example 1 | 10.9 | 0.7-4.2 | 30.3 |
| Comparative example 3 | 11.3 | 1.2-4.0 | 26.7 |

It can be seen from the above table that the test solution of latamoxef sodium for injection is easy to degrade and produce impurities after being destroyed under the strong alkali conditions, under the chromatographic conditions of the fifth embodiment, the resolution of any adjacent peaks can reach more than 2.0, the main peak can be effectively separated from each impurity peak without interference, and the auxiliary materials have no interference, and the retention time of the main peak is effectively maintained within 16 min; however, in the first comparative example and the third comparative example, there are impurity peaks that can't be effectively separated, the resolution of each peak is poor, and the retention time of the main peak is prolonged, which indicates that the present disclosure is more accurate and efficient for the impurity detection method damaged by the strong alkali of latamoxef sodium for injection.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A impurity detection method of latamoxef sodium configured to detect the impurities in latamoxef sodium for injection by using high performance liquid chromatography; chromatographic conditions as follows:
   a chromatographic column: taking Agilent ZORBAX SB-CN cyano bonded silica gel column as a stationary phase;
   a mobile phase: taking 0.005~0.015 mol/L ammonium acetate solution-methanol as a mobile phase A, wherein ammonium acetate solution: methanol is equal to 55~60:40~45, V/V; taking 0.02~0.03 mol/L ammonium acetate solution-acetonitrile as a mobile phase B, wherein ammonium acetate solution: acetonitrile is equal to 85~90:10~15, V/V; and
   adjusting a pH value of the ammonium acetate solution to 5.8~6.5.

2. The impurity detection method of latamoxef sodium as claimed in claim 1, wherein a length and an inner diameter of the Agilent ZORBAX SB-CN cyano bonded silica gel chromatographic column are 250 mm×4.6 mm, and a packing material size is 5 μm.

3. The impurity detection method of latamoxef sodium as claimed in claim 1, wherein the pH value of the ammonium acetate solution in the mobile phase A is adjusted by acetic acid to be 6.0; in the mobile phase B, the pH value of the ammonium acetate solution is adjusted by acetic acid to be 6.5.

4. The impurity detection method of latamoxef sodium as claimed in claim 1, wherein an elution process is a gradient elution process, with the elution progress, a volume ratio of the mobile phase A to the mobile phase B is gradually reduced from 73~78:22~27 to 28~33:67~72, and then increased from 28~33:67~72 to 73~78:22~27 for performing gradient elution to separate impurities.

5. The impurity detection method of latamoxef sodium as claimed in claim 4, wherein the gradient elution process is that:
   at 0 min, the volume ratio of the mobile phase A to the mobile phase B is 78:22;
   at 10 min, the volume ratio of the mobile phase A to the mobile phase B is 55:45;
   at 16 min, the volume ratio of the mobile phase A to the mobile phase B is 30:70;
   at 20 min, the volume ratio of the mobile phase A to the mobile phase B is 30:70;
   at 25 min, the volume ratio of the mobile phase A to the mobile phase B is 45:55; and
   at 30 min, the volume ratio of the mobile phase A to the mobile phase B is 78:22.

6. The impurity detection method of latamoxef sodium as claimed in claim 1, wherein a flow rate of the mobile phase is 0.5~0.8 mL/min.

7. The impurity detection method of latamoxef sodium as claimed in claim 1, wherein a detection wavelength is 250~260 nm.

8. The impurity detection method of latamoxef sodium as claimed in claim 1, wherein a column temperature is 30~35° C.

9. The impurity detection method of latamoxef sodium as claimed in claim 1, wherein an injection volume is 10~20 uL and an injection concentration is 1~2 mg/mL.

* * * * *